July 5, 1955 L. J. VAN DE POLDER 2,712,570

CIRCUIT-ARRANGEMENT IN TELEVISION RECEIVERS

Filed March 13, 1953

INVENTOR
LEENDERT JOHAN VAN DE POLDER
BY Fred M Vogel
AGENT

United States Patent Office 2,712,570

Patented July 5, 1955

2,712,570

CIRCUIT-ARRANGEMENT IN TELEVISION RECEIVERS

Leendert Johan van de Polder, Eindhoven, Netherlands, assignor to Hartford National Bank and Trust Company, Hartford, Conn., as trustee Application March 13, 1953, Serial No. 342,157

Claims priority, application Netherlands April 10, 1952

3 Claims. (Cl. 178—69.5)

The invention relates to a circuit-arrangement for use in a television receiver for the reception of television image signals and of horizontal synchronising pulses and vertical synchronising pulses, in which the synchronising signal for the vertical deflection sawtooth circuit is derived by frequency division by means of at least one frequency-dividing stage, from an oscillation derived from the horizontal synchronising pulses.

Although in the known television systems not only horizontal synchronising pulses but also vertical synchronising pulses are transmitted, it has frequently been suggested to use circuit-arrangements of the aforesaid kind for synchronising the vertical deflection sawtooth circuit. In this case the available vertical synchronising pulses are not used, but use is made of a signal which is derived by frequency division from an oscillation derived from the horizontal synchronising pulses.

This tendency is based on the fact that the synchronisation of the vertical deflection sawtooth circuit with the aid of the transmitted synchronising-pulse mixture gives rise to many difficulties and is very sensitive to interference signals.

Since in the television transmitters both the horizontal synchronising pulses and the vertical synchronising pulses are derived, usually by frequency division, from an oscillation, the frequency of which is twice the horizontal deflection frequency, doubling of the frequency of the horizontal synchronising oscillation and subsequent frequency division in one or more frequency-dividing stages in the receiver will produce a signal having the same frequency as the vertical synchronising pulses.

However, this signal cannot yet be used for synchronising purposes, since the correct phase relationship between this signal and the horizontal synchronising pulses is not determined.

The invention has for its object to provide a circuit-arrangement which obviates this disadvantage in a simple manner.

The circuit-arrangement according to the invention has the feature that an oscillation derived from the synchronising signal for the vertical deflector sawtooth generator and an oscillation derived from the vertical synchronising pulses are supplied to a phase-comparison stage and that, in the event of a phase difference between the oscillations fed to the phase-comparison stage, at least one frequency dividing stage is put out of order by means of the output voltage of the phase-comparison stage.

In the circuit-arrangement according to the invention the available vertical synchronising pulses are used only to determine the phase of the synchronising signal.

Figure 1:
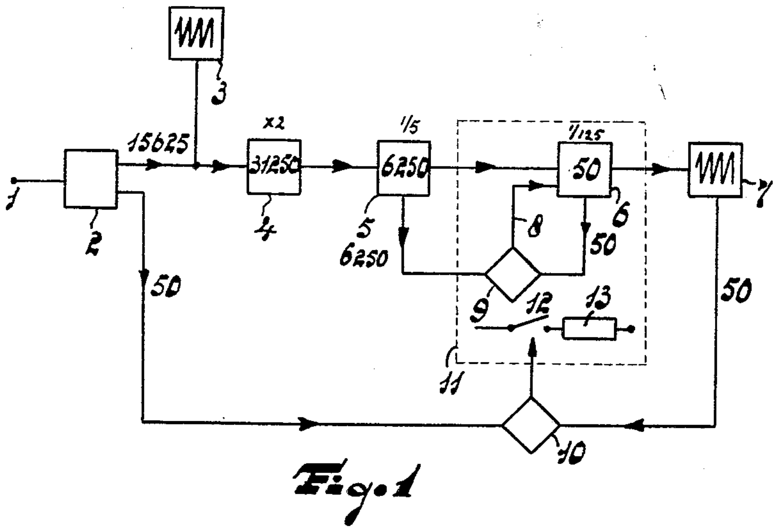
Figure 2:
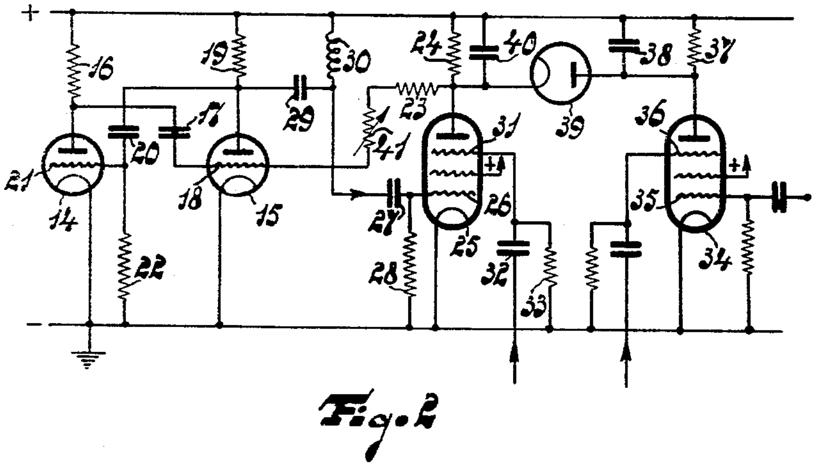

In order that the invention may be readily carried into effect, it will now be described in detail with reference to the accompanying drawing, in which:

Fig. 1 shows diagrammatically in block form one embodiment of the invention; and Fig. 2 is a detail view of one embodiment of the invention.

Referring to Fig. 1 a detected television signal, comprising vertical synchronising pulses and horizontal synchronising pulses is fed at 1 to a device 2 of known kind, in which the synchronising signal is separated from the image signal.

From the device 2 is derived a signal, which comprises the horizontal synchronising pulses having a recurrence frequency of 15,625 C./S. This frequency occurs in a television system having 625 lines per frame and 25 frames in one second.

With the aid of these horizontal synchronising pulses the horizontal deflection sawtooth circuit 3 is controlled. These pulses are, moreover, fed to the frequency-doubling stage 4, in which an oscillation having a frequency of 31,250 C./S., is produced. This oscillation is supplied to the frequency-dividing stage 5, in which the frequency is divided by 5. The oscillation thus produced having a frequency of 6250 C./S., is supplied to the frequency-dividing stage 6, in which a frequency division by a factor 125 takes place, so that an oscillation having a frequency of 50 C./S. is produced, having the correct frequency for use as synchronising signal for the vertical deflection sawtooth circuit 7.

The reduction of the frequency by a factor 125 in the frequency-dividing stage 6 is rendered possible, since the frequency of this stage is controlled by the output voltage of the phase-comparison stage 9, supplied through the conductor 8. To this phase-comparison stage is supplied both an oscillation having a frequency of 6250 C./S. from the dividing stage 5 and an oscillation from the dividing stage 6.

In order to obtain the correct phase of the synchronising signal for the vertical deflection sawtooth circuit, a signal is derived from this signal, in the present case from the vertical deflection sawtooth circuit 7, and supplied to the phase-comparison stage 10.

For the sake of clearness it should be noted that pulses may be derived in a simple manner from the vertical deflection sawtooth circuit 7, which pulses occur during the fly-back of the sawtooth oscillation produced. These fly-back pulses are supplied to the phase-comparison stage 10.

From the device 2 is derived a signal comprising the detected vertical synchronising pulses having a frequency of 50 C./S.

If an incorrect phase relationship between the oscillations supplied to the phase-comparison stage 10 prevails, the frequency-dividing stage 6 is put out of order. This is shown diagrammatically in Fig. 1 by means of the switch 12 and the impedance 13 within the rectangle 11, shown in broken lines.

In the event of correct phase relationship, for example, this impedance 13 is not included in the frequency-dividing stage 6 or in the phase-comparison stage 9, controlling this dividing stage. However, if in the case of incorrect phase relationship this impedance is included in one of these stages, which is indicated symbolically by the switch 12, which is then closed, the frequency of the oscillation produced by the dividing stage 6 varies and hence the frequency of the vertical deflection sawtooth circuit 7 and the fly-back pulses derived therefrom.

If these fly-back pulses and the vertical synchronising pulses attain the correct phase relationship, the impedance 13 is switched off and the correct phase relationship is maintained.

In the circuit-arrangement shown in Fig. 2 the dividing stage 6 of Fig. 1 is constructed in the form of a multivibrator circuit, comprising the two discharge tubes 14 and 15. The anode circuit of the tube 14 includes a resistor 16 and the anode of the tube 14 is connected through a capacitor 17 to the control-grid 18 of the tube 15. The anode circuit of the tube 15 includes a resistor 19 and the anode of the tube 15 is connected through a capacitor 20 to the control-grid 21 of the tube 14. This control-grid is connected to ground through a resistor 22.

The control-grid 18 of the tube 15 is connected through the series combination of the variable resistor 41, the resistor 23, and the resistor 24, to the positive terminal of the supply source.

The frequency of the oscillation produced by the multivibrator, which will be approximately 50 C./S., is determined by the value of the voltage across the resistor 24.

This resistor 24 is included in the anode circuit of the tube 25, which corresponds to the phase-comparison stage 9 of Fig. 1. To the control-grid 26 of this tube is supplied through the capacitor 27 and the grid leak resistor 28 a voltage which is derived from the multivibrator through the capacitor 29 and the inductor 30; the two latter elements form a series resonance circuit, with the aid of which the output voltage of the multivibrator is differentiated.

At the control-grid 26 of the tube 25 thus occur pulses having a recurrence frequency which is equal to that of the multivibrator; these pulses are limited in known manner by grid current.

To the collecting grid 31 of the tube 25 are supplied in a similar manner through the capacitor 32 and the leak resistor 33, pulses from the frequency-dividing stage 5, shown in Fig. 1, and having a recurrence frequency of 6250 C./S.; the peaks of these pulses can be kept on a constant level in known manner.

The tube 25 can take anode current only if at the same time pulses occur at the control-grid 26 and at the collecting grid 31. At this desired phase relationship of the supplied pulse series a definite voltage occurs in the anode circuit across the resistor 24, with which the capacitor 40 is connected in parallel; the frequency of the multivibrator is controlled by this voltage.

The circuit-arrangement comprises a fourth discharge tube 34, the function of which corresponds with that of the phase comparison stage 10, shown in Fig. 1.

To the control-grid 35 of this tube are supplied in a self-explanatory manner the fly-back pulses of the vertical deflection sawtooth circuit (not shown), and to the collecting grid 36 are supplied the detected vertical synchronising pulses.

If the two pulses are operative at the same time, anode current will pass through the tube and through the anode resistor 37, with which a capacitor 38 is connected in parallel. Thus a voltage drop occurs across the anode of the tube 34. This anode is connected to the anode of a diode 39, the cathode of which is connected to the anode of the tube 25.

This diode 39 fulfills the function of the switch 12, shown in Fig. 1.

Since at the correct phase relationship between the fly-back pulses and the detected vertical synchronising pulses the anode voltage of tube 34 is low, the diode 39 will not be conductive, if the voltage at the anode of tube 25 is higher, which may be ensured by correct choice of the resistors 37 and 24.

However, if the correct phase relationship does not prevail, the tube 34 is not conductive and the anode voltage of this tube is high, so that the diode 39 is conductive, the resistor 37 and the capacitor 38 being then connected in parallel with the resistor 24, which corresponds to the switching-on of the impedance 13, shown in Fig. 1. Thus the voltage across the resistor 24 varies and hence also the control-voltage of the multivibrator circuit, the frequency of which will vary. Thus also the frequency of the fly-back pulses of the vertical deflection sawtooth circuit varies, since this circuit is synchronised by the multivibrator. As soon as the correct phase relationship between the fly-back pulses and the detected vertical synchronising pulses has been reached, anode current will pass through the tube 34 and the diode 39 becomes non-conductive. The frequency of the multivibrator is then readjusted by the output voltage of the tube 25.

Since the capacitor 38 is rapidly discharged by the anode current of tube 34, since, however, the charge of the capacitor may be performed comparatively slowly, if the time constant of the resistor 37 and the capacitor 38 is suitably chosen, the failing of one or more detected vertical synchronising pulses at the collecting grid 36 does not yet exert any influence, since the voltage at the anode of the tube 34 drops only slowly, so that the diode remains non-conductive for some additional time.

While we have thus described our invention with specific examples and embodiments thereof, other modifications will be readily apparent to those skilled in the art without departing from the spirit and the scope of the invention as defined in the appended claims.

What is claimed is:

1. A circuit-arrangement in a television receiver for the reception of image signals and of horizontal synchronising pulses and vertical synchronising pulses comprising a frequency divider having a frequency-dividing stage for deriving a vertical synchronising signal from an oscillation derived from the horizontal synchronising pulses, a vertical deflection sawtooth circuit, means for applying said vertical synchronising signal to said vertical deflection sawtooth circuit to produce a vertical deflection sawtooth voltage therein, a phase comparison stage, means for applying said vertical deflection sawtooth voltage to said phase comparison stage, means for applying the vertical synchronising pulses to said phase comparison stage to produce an indication of the phase relationship of said sawtooth voltage and said vertical synchronising pulses, means connected between the output of said phase comparison stage and said frequency divider stage and responsive to said indication for varying the frequency of said frequency divider stage in the event of a phase difference.

2. A circuit-arrangement in a television receiver for the reception of television image signals and of horizontal synchronising pulses and vertical synchronising pulses comprising a frequency divider having succeeding first and second frequency-dividing stages for deriving a vertical synchronising signal from an oscillation derived from the horizontal synchronising pulses, a vertical deflection sawtooth circuit, means for applying said vertical synchronising signal to said vertical deflection sawtooth circuit to produce a vertical deflection sawtooth voltage therein, a first phase comparison stage for indicating the phase relationship between said vertical deflection sawtooth voltage and said vertical synchronising pulses, means for applying said vertical deflection sawtooth voltage to said phase comparison stage, means for applying the vertical synchronising pulses to said phase comparison stage, a second phase comparison stage for providing a control voltage to control the output frequency of said second frequency-dividing stage, means for applying said vertical synchronising signals to said second comparison stage, means for applying oscillations derived from the first frequency dividing stage to said second comparison stage, and means connected between the output of said first phase comparison stage and the output of said second phase comprison stage for varying the control voltage of said second comparison stage to effect a variation of the frequency of said second dividing stage when a phase difference exists between said sawtooth voltage and said vertical synchronising pulses.

3. A circuit-arrangement, as set forth in claim 2, wherein said last-named means includes a device conductive in one direction.

References Cited in the file of this patent

UNITED STATES PATENTS

| | | |
|---|---|---|
| 2,570,775 | De Baun | Oct. 9, 1951 |
| 2,597,743 | Millspaugh | May 10, 1952 |